United States Patent
Reverte et al.

(10) Patent No.: US 11,245,719 B2
(45) Date of Patent: Feb. 8, 2022

(54) SYSTEMS AND METHODS FOR ENHANCED HOST CLASSIFICATION

(71) Applicant: Oracle International Corporation, Redwood Shores, CA (US)

(72) Inventors: Carlos Reverte, Pinecrest, FL (US); Daniel Fichter, Brooklyn, NY (US); Matthew Perry Abrams, Las Cruces, NM (US); Aparajeeth Thupil, Short Hills, NJ (US); Richard Scott LaBarca, Bayport, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 488 days.

(21) Appl. No.: 16/246,137

(22) Filed: Jan. 11, 2019

(65) Prior Publication Data
US 2020/0228565 A1 Jul. 16, 2020

(51) Int. Cl.
*H04L 29/06* (2006.01)
*G06N 20/00* (2019.01)
(Continued)

(52) U.S. Cl.
CPC ......... *H04L 63/1441* (2013.01); *G06N 20/00* (2019.01); *H04L 43/16* (2013.01);
(Continued)

(58) Field of Classification Search
CPC ............. H04L 63/1441; H04L 63/0263; H04L 63/145; H04L 63/1425; H04L 63/1466;
(Continued)

(56) References Cited

U.S. PATENT DOCUMENTS

| 8,478,708 | B1 * | 7/2013 | Larcom ................. G06Q 10/10 706/52 |
| 8,856,869 | B1 * | 10/2014 | Brinskelle ........... G06F 21/6218 726/2 |

(Continued)

OTHER PUBLICATIONS

"Panopticlick 3.0, Is your browser safe against tracking?", retrieved from https://panopticlick.eff.org. on Jan. 29, 2019, 2 pages.
(Continued)

*Primary Examiner* — Hosuk Song
(74) *Attorney, Agent, or Firm* — Kilpatrick Townsend & Stockton LLP

(57) ABSTRACT

Certain aspects and features of the present disclosure relate to systems and methods for automatically classifying hosts in real-time. For instance, classifying hosts as bots, and subsequently mitigating or blocking traffic from the hosts classified as bots can be advantageous in real-time data exchange systems. In a real-time data exchange system, data can be exchanged between a server and a target host in real-time when the target host accesses a webpage. Inhibiting data communication between servers and hosts operated by bot scripts can reduce fraudulent activity. In some implementations, hosts can be automatically classified into various groups based at least in part on the data included in requests received from the hosts.

20 Claims, 7 Drawing Sheets

(51) Int. Cl.
*H04L 12/26* (2006.01)
*H04L 29/08* (2006.01)

(52) U.S. Cl.
CPC ...... *H04L 63/0263* (2013.01); *H04L 63/1425* (2013.01); *H04L 67/2833* (2013.01); *H04L 67/327* (2013.01); *H04L 2463/144* (2013.01)

(58) Field of Classification Search
CPC ............. H04L 63/1483; H04L 63/1491; H04L 2463/144; H04L 43/16; H04L 67/2833; H04L 67/327; G06N 20/00
See application file for complete search history.

(56) References Cited

U.S. PATENT DOCUMENTS

| | | | | |
|---|---|---|---|---|
| 9,118,689 | B1 * | 8/2015 | Apte | H04W 12/06 |
| 9,325,728 | B1 * | 4/2016 | Kennedy | H04L 63/1433 |
| 9,584,524 | B2 * | 2/2017 | Du | H04L 47/60 |
| 9,838,394 | B2 * | 12/2017 | Du | H04L 67/12 |
| 2013/0198203 | A1 | 8/2013 | Bates et al. | |
| 2016/0006744 | A1 | 1/2016 | Du et al. | |
| 2018/0103047 | A1 | 4/2018 | Turgeman et al. | |

OTHER PUBLICATIONS

"Oracle BlueKai: Data Management Program", retrieved from https://www.oracle.com/marketingcloud/products/data-management-platform/ on Jan. 29, 2019, 5 pages.
"About Oracle—AddThis" retrieved from https://www.addthis.com/about/oracle/ on Jan. 29, 2019, 4 pages.
Oracle and Crosswise, "Oracle Busy Crosswise" retrieved from https://www.oracle.com/corporate/acquisitions/crosswise/ on Jan. 29, 2019, 2 pages.
Chu et al., "Bot or Human? A Behavior-Based Online Bot Detection System", Springer International Publishing, XP047496696, Nov. 30, 2018, pp. 432-449.
International Application No. PCT/US2020/013022, International Search Report and Written Opinion dated Mar. 31, 2020, 12 pages.

* cited by examiner

SYSTEMS AND METHODS FOR ENHANCED HOST CLASSIFICATION

TECHNICAL FIELD

The present disclosure generally relates to systems and methods for classifying hosts in a network environment. More particularly, the present disclosure relates to systems and methods for automatically detecting hosts operated by bot scripts in real-time to efficiently manage content delivery in data exchange systems.

BACKGROUND

Cloud-based networks can facilitate communication exchange for a large number of hosts (e.g., computing devices, machines, servers, bot scripts, users, services, systems, databases, etc.). Further, cloud-based networks often use a single exit point for Internet traffic out of the cloud-based networks. For example, hosts within a cloud-based network may share an Internet Protocol (IP) address to communicate with servers external to the cloud-based network. From the external server's perspective, multiple communications received from different hosts within the cloud-based network can appear as if they were transmitted from a single host.

In some situations, bot scripts can been configured to mimic hosts operated by humans for the purpose of performing fraudulent activity. However, when multiple hosts share the same IP address, detecting which hosts are operated by humans and which hosts are operated by bot scripts is technically challenging. For instance, the multiple hosts would need to be differentiated, and then the server interactions of each unique host would need to be separately evaluated to determine whether or not the host was operated by a bot script. When a subset of hosts operated by bot scripts share the same IP address, often the approach taken is to block all hosts from that IP address, even if hosts operated by human users also share that same IP address. Certain techniques have been used to differentiate hosts (e.g., device fingerprinting), however, these techniques often result in classification collisions, in which two different hosts are classified as being the same host. Further, when hosts share an IP address, differentiating unique hosts is technically difficult because the IP address is often used to differentiate hosts. Adding to the technical challenge, in data exchange systems, bot detection should occur in real-time. However, automatically detecting bot scripts in real-time is often inaccurate due to the difficulty in leveraging existing metadata to assist in the bot detection.

SUMMARY

Certain aspects and features of the present disclosure relate to systems and methods for automatically classifying hosts in real-time. For instance, classifying hosts as bots, and subsequently mitigating or blocking traffic from the hosts classified as bots can be advantageous in real-time data exchange systems. In a real-time data exchange system, data (e.g., content data, such as an ad) can be exchanged between a server and a target host in real-time when the target host accesses a webpage. Inhibiting data communication between servers and hosts operated by bot scripts can reduce fraudulent activity. In some implementations, hosts can be automatically classified into various groups based at least in part on the data included in requests received from the hosts.

To illustrate and only as a non-limiting example, a host may share an IP address with multiple other hosts using the same cloud-based network. Some hosts may be operated by bot scripts, and other hosts may be operated by human users. However, when communications are received from the multiple hosts at an external server, the communications from all of the hosts may appear to be from a single host because the hosts share the same IP address. According to certain embodiments of the present disclosure, communications from the multiple hosts can be automatically and accurately classified into various groups, for example, into a first group for hosts operated by human users and a second group for hosts operated by bot scripts. Data communication can be blocked or mitigated for the hosts detected to be operated by bot scripts to prevent fraudulent activity.

In some implementations, a host classification system can be implemented in a real-time data exchange system. The real-time data exchange system may be a programmatic data stream of a demand-side platform that controls content delivery between servers and target hosts that access a particular webpage. For example, the real-time data exchange system can manage content delivery by receiving a request to access the particular webpage from a target host, identifying one or more content objects displayable in the particular webpage, retrieving the one or more content objects from a database, and transmitting the one or more content objects to the target host, so that when the particular webpage is loaded on to a screen of the particular host, the particular webpage displays the one or more content objects. However, in situations where the target host is operated by a bot, it is advantageous to mitigate or block the content delivery to the target host. Accordingly, in some implementations, the host classification system can be configured to be located (in the data flow) between the real-time data exchange system and the target host. The host classification system can initially receive a request to access a webpage from a host. In some implementations, the request can include a data string. As non-limiting examples, the data string can be or include a HyperText Transfer Protocol (HTTP) query string that includes one or more request parameters (e.g., characteristics) associated with the host, the data included in the network packet headers transmitted from the host to a web server to request access to a webpage, or any other suitable data. Non-limiting examples of request parameters associated with the host can include a timestamp or uptime since the last device reboot, IP address, user agent, browser version, screen size, and other suitable characteristics. Upon receiving the request from the target host, the host classification system can automatically evaluate the data string to detect whether or not the target host is operated by a bot script or a human user. In some implementations, evaluating the data string can include accessing one or more rules for determining whether the target host is operated by a bot script or a human user. In some implementations, the rules may include conditions that, upon satisfaction of the conditions, indicate that the target host is detected to be operated by a bot script. As a non-limiting example, a rule may include executable code that, when executed, evaluates how long it has been since the target host was last restarted by evaluating the uptime of the target host (e.g., which is included as data in the data string). If, for example, the uptime is less than two seconds (e.g., an uptime of one second since the target host was last restarted), then the rule may indicate that the target host is operated by a bot script (because an uptime of one second before transmitting a request for a webpage is impossible by a human user). As another non-limiting example, the rule may include executable code that, when executed, evaluates metadata associated with the target host to identify how many webpages the target host has requested to access within the last five minutes. If the number of webpages accessed by the target host within the last five minutes is above a time threshold (e.g., over 10,000 webpages), then the rule may indicate that the target host is detected to be operated by a bot.

Based at least in part on a result of evaluating the data string against the one or more rules, the host classification system may classify the target host. In some implementations, if the target host is classified as being operated by a bot script, then the host classification system can automatically transmit a signal to the real-time data exchange system. The signal may include data that, upon being received at the real-time data exchange system, causes or instructs the real-time data exchange system to inhibit, prevent, or block content delivery of the one or more content objects to the target host. In this case, when the webpage is loaded on to the target host, the one or more content objects would not appear on the webpage. Conversely, if the one or more rules indicate that the target host is detected as being operated by a human user, then the host classification system can transmit a signal to the real-time data exchange system. In this case, however, the signal includes data that causes or instructs the real-time data exchange system to proceed with transmitting the one or more content objects to the target host, so that when the webpage is loaded on the target host, the one or more content objects are included in the webpage.

It will be appreciated that the present disclosure is limited to accessing webpages. Any other data source or network location can be accessed in a request from the target host. For example, the target host may request an interface page of a native application running on the target host. The real-time data exchange system can manage content delivery of one or more content objects that are displayable on interface pages within the native application.

In some implementations, interactions between the real-time data exchange system and target hosts can be logged, for example, in log records. The log records may include various data, for example, the data strings associated with the previous requests to access one or more webpages. The host classification system can identify one or more hosts detected to be operated by a bot script. For example, the host classification system can identify instances in which the host was detected to have an uptime of one second, which would indicate that the host was operated by a bot because a human user could not start a computer and load a webpage within one second. The host classification system can then use one or more machine-learning techniques and/or artificial intelligence techniques to evaluate the collected log records associated with the hosts detected as being a bot to identify patterns between the uptime values of the various log records. The machine-learning techniques may include, for example, one or more machine-learning algorithms, such as an ensemble of multi-label classifiers (e.g., supervised or unsupervised learning), artificial neural networks (including backpropagation, Boltzmann machines, etc.), Bayesian statistics (e.g., Bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised, semi-supervised, or unsupervised). The detected patterns of uptimes can be used to define a new rule used by the host classification system in future host classifications. As a non-limiting example, the detected pattern may be a pattern associated with an IP address. The pattern may be that the uptimes for 10 hosts associated with the same IP address are always spaced exactly one second apart from each other. In other words, for every requested webpage, the uptime for 10 hosts associated with the IP address are received at the same time and include uptimes that are spaced exactly one second apart (e.g., host #1 has an uptime of 1 second, host #2 has an uptime of two seconds, host #3 has an uptime of three seconds, and so on). Even though the uptimes are different from each other, which suggests that the hosts are unique users, the host classification system can still detect these 10 hosts as being operated by bot scripts because it is unlikely that 10 human users access the same webpage at the same time, and that they each restarted his or her device one second apart. Accordingly, this new pattern of uptimes can be used to detect future instances of bot traffic at the real-time data exchange system.

Certain embodiments relate to a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including: receiving a request to retrieve webpage data stored at a server, the webpage data corresponding to a webpage that is configured to display one or more content objects (e.g., ads), the request corresponding to a data string that includes one or more request parameters (e.g., the data string can be an http string that includes request parameters, such as device uptime, user agent, browser version, IP address, screen size, etc.), each request parameter of the one or more request parameters characterizing a client device, and the one or more request parameters including at least an uptime of the client device; extracting the one or more request parameters included in the data string of the request; accessing one or more rules for detecting whether the client device is operated by a bot script or a human, each rule of the one or more rules including a condition that, upon satisfaction, indicates that the client device is operated by a bot script; accessing metadata associated with the client device, the metadata representing one or more previous interactions between the client device and the server. The computer-implemented method also includes automatically determining whether or not to transmit a particular content object to the client device, the automatic determination being based on a result of evaluating the one or more rules using the uptime of the client device, the one or more request parameters, and/or the metadata associated with the client device. The computer-implemented method also includes in response to determining to transmit the particular content object to the client device, transmitting the particular content object, the transmission of the particular content object indicating that the client device is detected as being operated by a human. Other embodiments of this aspect include corresponding computer systems, apparatus, and computer programs recorded on one or more computer storage devices, each configured to perform the actions of the methods.

One general aspect includes a system, including: one or more data processors; and a non-transitory computer-readable storage medium containing instructions which, when executed on the one or more data processors, cause the one or more data processors to perform operations including. The system also includes receiving a request to retrieve webpage data stored at a server, the webpage data corresponding to a webpage that is configured to display one or more content objects, the request corresponding to a data string that includes one or more request parameters, each request parameter of the one or more request parameters characterizing a client device, and the one or more request parameters including at least an uptime of the client device. The system also includes extracting the one or more request parameters included in the data string of the request. The system also includes accessing one or more rules for detecting whether the client device is operated by a bot script or a human, each rule of the one or more rules including a condition that, upon satisfaction, indicates that the client device is operated by a bot script. The system also includes accessing metadata associated with the client device, the metadata representing one or more previous interactions between the client device and the server. The system also includes automatically determining whether or not to transmit a particular content object to the client device, the automatic determination being based on a result of evaluating the one or more rules using the uptime of the client device, the one or more request parameters, and/or the metadata associated with the client device. The system also includes in response to determining to transmit the particular content object to the client device, transmitting the particular content object, the transmission of the particular content object indicating that the client device is detected as being operated by a human. Other embodiments of this aspect include corresponding computer systems, apparatus, and computer programs recorded on one or more computer storage devices, each configured to perform the actions of the methods.

One general aspect includes a computer-program product tangibly embodied in a non-transitory machine-readable storage medium, including instructions configured to cause a data processing apparatus to perform operations including: receiving a request to retrieve webpage data stored at a server, the webpage data corresponding to a webpage that is configured to display one or more content objects, the request corresponding to a data string that includes one or more request parameters, each request parameter of the one or more request parameters characterizing a client device, and the one or more request parameters including at least an uptime of the client device; extracting the one or more request parameters included in the data string of the request; accessing one or more rules for detecting whether the client device is operated by a bot script or a human, each rule of the one or more rules including a condition that, upon satisfaction, indicates that the client device is operated by a bot script; accessing metadata associated with the client device, the metadata representing one or more previous interactions between the client device and the server. The computer-program product also includes automatically determining whether or not to transmit a particular content object to the client device, the automatic determination being based on a result of evaluating the one or more rules using the uptime of the client device, the one or more request parameters, and/or the metadata associated with the client device. The computer-program product also includes in response to determining to transmit the particular content object to the client device, transmitting the particular content object, the transmission of the particular content object indicating that the client device is detected as being operated by a human. Other embodiments of this aspect include corresponding computer systems, apparatus, and computer programs recorded on one or more computer storage devices, each configured to perform the actions of the methods.

Advantageously, in instances where multiple hosts communicate with a server from a shared IP address, certain embodiments of the present disclosure can be used to identify which hosts of the multiple hosts are unique (e.g., by evaluating the uptime of each host, which may be a reliable indicator for differentiating hosts). Further, the unique hosts and their corresponding interactions with a real-time data exchange system can be evaluated to determine whether or not each host is operated by a bot. For hosts detected to be operated by a bot, the real-time data exchange system can automatically block content delivery to the detected bot users in conjunction with the bot users' requests to access webpages. Additionally, certain embodiments relating to the technical solution of detecting bots in scenarios where multiple hosts share an IP address, but only some of those hosts are operated by bot scripts (e.g., the remaining hosts are operated by human users) is highly advantageous. In some implementations, the uptime (e.g., the amount of time since the last device restart) can be evaluated, along with additional metadata associated with the host and one or more rules, to detect bot users and prevent their access to content.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
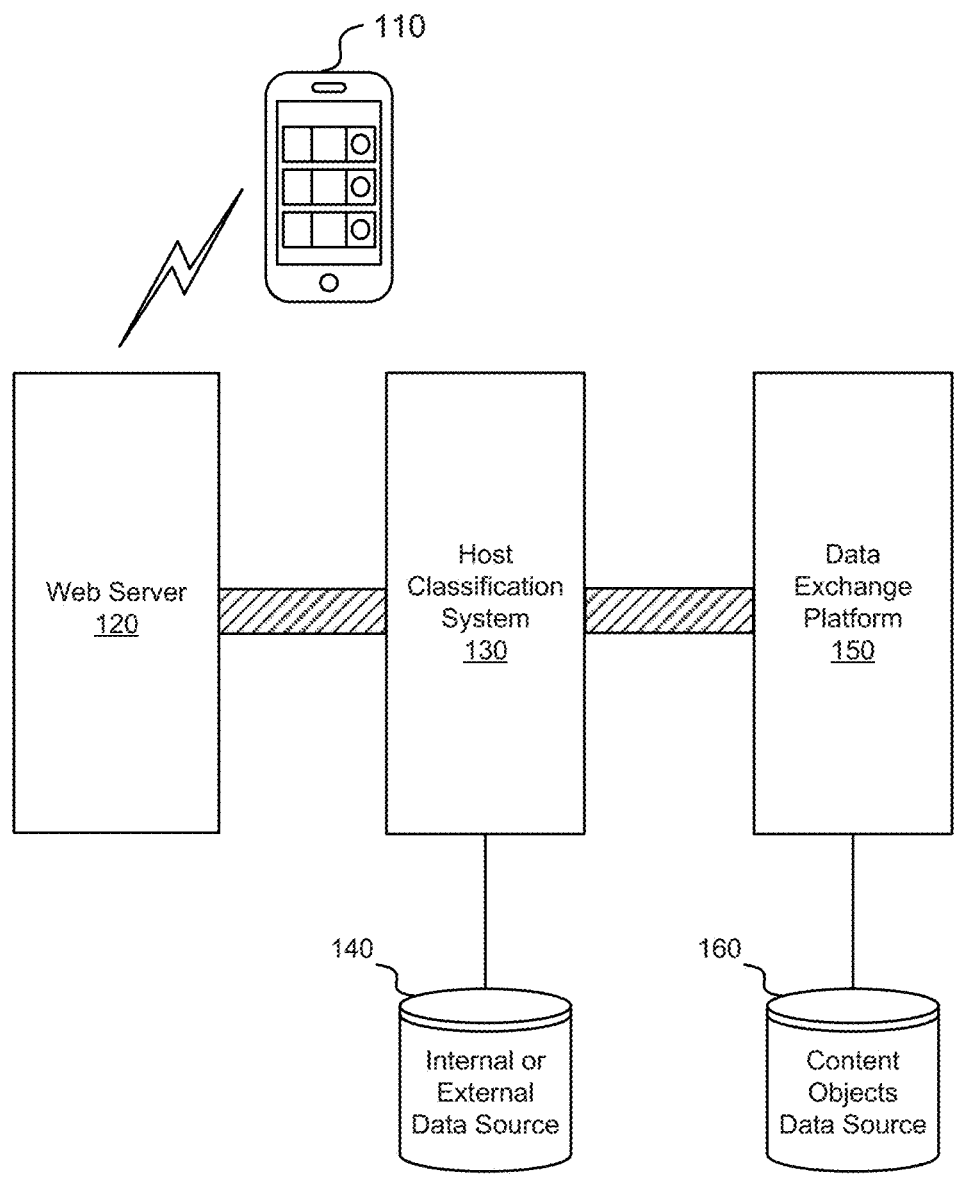
FIG. 1 is a block diagram illustrating an example network environment for device classification, according to embodiments of the present disclosure.

In the following description, for the purposes of explanation, specific details are set forth in order to provide a thorough understanding of embodiments of the invention. However, it will be apparent that various embodiments may be practiced without these specific details. The figures and description are not intended to be restrictive.

Typical host classification (e.g., device fingerprinting) may result in classification collisions, in which two different hosts are incorrectly classified as a single host. According to certain embodiments that enhance host classification, interactions between a server and a host can be evaluated by analyzing the data available in network packet headers transmitted by the host. For example, the data included in a network packet header (e.g., of a request to access a webpage) may include an uptime (e.g., a time value or a trusted third party (TTP) timestamp) that represents how long the device (e.g., the device that is the host, such as a user device, a computer, a server, and so on) has been running since the device was last rebooted. When the multiple hosts that share the same IP address are evaluated, the uptime of each host can be a reliable indicator to differentiate unique hosts. Further, the uptime of a host can also be evaluated to determine whether or not the host is a bot. For example, if a host is requesting access to a webpage, but the network packet headers and/or the HTTP query string received from the host indicates that the uptime of the host is one second, that host can accurately be classified as being operated by a bot because a human user cannot reboot a computer and load a webpage within one second.

In some implementations of the embodiments described herein, the uptimes across a set of hosts can be evaluated to identify which subset of hosts are detected as being operated by bot scripts, and which subset of hosts are detected as being operated by human users. Further, in some implementations, a host classification system can be provided in a data flow between a real-time data exchange system (e.g., a real-time bidding programmatic stream of a demand-side platform or an ad exchange) and a target host (e.g., a host requesting access to a webpage or interface of an application). The real-time data exchange system can transmit one or more content objects (e.g., ads) to the target host in response to the target host's request to access a webpage or an application.

Fraudulent activity can be prevented by inhibiting content delivery to hosts that are detected as being bot scripts mimicking human users. In some implementations, the host classification system can evaluate the data available in network packet headers received from the target host to instruct the real-time data exchange system on whether or not to transmit the one or more content objects to the target host. If the host classification system classifies the target host as a being operated by a bot script, then the host classification system can advantageously inhibit the real-time data exchange system from transmitting the one or more content objects to the target host in real-time as the webpage is being loaded on the target host. Because the host classification system evaluates the data available in the network packet headers (e.g., the uptime) received from the target host, the host classification system can make real-time decisions on whether or not the target host should receive the one or more content objects.

In some implementations, the host classification system can receive one or more signals from target hosts that access one or more webpages. A host may be referred to as a target host when the host is the target of a decision to receive the one or more content objects that are displayable on a webpage. The one or more signals can include a request to access a particular webpage. The request can be represented by one or more network packet headers transmitted from the target host (e.g., an HTTP stream). Further, the one or more network packet headers can include a Trusted Third Party (TTP) timestamp, which indicates the most recent time at which the host was rebooted. Certain embodiments of the present disclosure can evaluate the TTP timestamp (also referred to herein as the uptime, which is the difference between the current time and the TTP timestamp representing an amount of time since the last reboot) to help identify unique hosts (e.g., machines, computer devices, servers, etc.) behind the same IP address. Without the TTP timestamp, often multiple hosts can appear as a single host because the multiple hosts share the same IP address.

In some situations, the same IP address that different machines use to access the Internet can sometimes be a proxy service, which is a service that deliberately obfuscates the source of web traffic to websites. In some situations, the same IP address could be used by all computers within an institution, such as a network of a university or library. In other situations, several hosts, such as a laptop and a smart television can access the Internet using the same household IP address. However, the TTP timestamp can be evaluated to track signals from different hosts that are accessing the Internet behind the same IP address.

In some situations, if a set of hosts are behind the same IP address, a first subset of the set of hosts may be operated by human users, and a second subset of the set of hosts may be operated by bot scripts. In these situations, if the IP address is associated with bot traffic (and thus, blacklisted), then all hosts associated with the IP address were typically blocked, resulting in human users being blocked from content. Alternatively, if the IP address was not blocked, then all hosts associated with the IP address were delivered content by the real-time data exchange system, resulting in fraudulent activity by providing bots with content. Thus, the IP address alone is insufficient for mitigating or preventing bot traffic. According to certain embodiments of the present disclosure, however, the data available in the network packet headers (e.g., the uptime value included in an HTTP stream) received from hosts can be evaluated to enable the host classification system to make real-time decisions as to whether or not to transmit content objects to a given target host. For example, if the uptime value for a given target host is below a certain time threshold, then that target host can be detected as being operated by a bot script, and thus, prevented from receiving the one or more content objects. As a non-limiting example, the host classification system can be located in a bid stream of an ad exchange program to make a real-time decisions on behalf of advertisers as to whether or not to purchase an ad for a target webpage visitor. Advantageously, instead of blocking content for all hosts behind an IP address associated with bot traffic, or instead of providing content to all hosts behind the IP address associated with bot traffic in order to reach the human users, certain embodiments of the present disclosure can differentiate hosts and provide content to each host associated with the same IP address on a per-host basis.

In some implementations, the host classification system can access metadata associated with hosts. Metadata can be collected for various hosts accessing one or more webpages. For instance, when a host accesses a webpage, the webpage (and potentially affiliates of the webpage) can collect metadata associated with the host. The metadata may be collected in log records, for example, and the log records may contain any data detectable from the host's interaction with the webpage. Non-limiting examples of metadata that can be collected include the number of times the webpage was visited, timestamp for each instance the webpage was visited, previous webpages visited, a number of times a previous webpage was visited, the data included in the network packet headers for each instance the webpage was visited, the uptime at each instance the webpage was visited, the IP address associated with each host interaction, and any other suitable data.

Accordingly, even if a network proxy modifies the uptime included in the network packet headers from a host to deliberately obfuscate the real uptime for the host, the modifications can be detected by the host classification system. As a non-limiting example, if the host classification system detects that the metadata collected for a particular host indicates that the particular host visited 1000 webpages within a 5 minute window, and if each visit to a webpage is associated with the same uptime, then the host classification system can determine that the IP address is associated with a network proxy, and that the network proxy is modifying the network packet headers to deliberately obfuscate the real-time data exchange system.

In some implementations, the host classification system can evaluate network packet headers received from IP addresses to determine whether the IP address is exhibit uptime continuity. For example, at a given time A, the host classification system can evaluate the uptimes of the various network packet headers received from IP address 123 during a time window, and determine that the IP address 123 is associated with 10 unique hosts (e.g., due to there being 10 unique uptimes within the time window). As a further example, if at a given later time B, the host classification system again evaluates the uptimes of various network packet headers received from IP address 123 during a different time window, but determines that the IP address 123 is associated with 10,000 unique hosts (e.g., due to there being 10,000 unique uptimes), then the host classification system can determine that IP address 123 is likely a network proxy that is obfuscating bot traffic. In this example, the 10 unique hosts detected at time A was not consistent with the 10,000 unique hosts detected for time B, and thus, the IP address can be detected as being associated with bot traffic.

The host classification system can generate a score for each target host visiting a webpage. Further, the host classification system can evaluate the score to determine whether or not to transmit a content object to the target host. The score can be calculated independently for each host associated with the same IP address. In some implementations, the score can be generated based at least in part on the IP address, the uptime of the target host and/or a combination thereof. The IP address combined with the uptime of the target can correspond to a fingerprint of the target host. In some implementations, the score can represent a degree to which the host is likely to be operated by a human user. Generating the score (e.g., a human user score) for the client device can include evaluating the one or more rules using the uptime of the client device, the one or more request parameters, and/or the metadata associated with the client device. Further, the human user score can represent a degree to which the client device is detected as being operated by a human. The human user score can be evaluated, among other data, to determine whether or not to transmit the particular content object to the client device. As a non-limiting example, the score can be generated as a scaled value, such that the more metadata that indicates the host is likely to be operated by a human, the higher the score, whereas, the less metadata that indicates the host is likely operated by a human, the lower the score (and vice versa, such that the lower the score, the more likely the user is likely to be human).

It will be appreciated that the present disclosure is not limited to real-time bot detection. In some implementations, an offline learner can evaluate data collected from target hosts for each IP address to identify patterns associated with hosts classified as bots for a given IP address. As a non-limiting example, patterns associated with hosts classified as bots may include a host using an IP address to load a webpage once a minute, every minute for 10 days straight, a host visiting 12 websites simultaneously within one second, or a host loading webpages in English, Turkey, and Japanese all within a short span of time (e.g., one to five seconds). The example patterns described above would be associated with hosts operated by bot scripts because human users are not capable of browsing the Internet with these patterns. The uptime for each interaction can be used to differentiate between hosts so as to eliminate false negatives and false positives in the classification of bots.

In some implementations, one or more rules can be defined to detect bots. A rule be represented by data indicating a condition. In some implementations, the condition of the rule may be used to evaluate the metadata associated with a target host. If the metadata satisfies the condition, then the rule may indicate that the target host is operated by a bot script (or a human user). As a non-limiting example, a rule may be defined to evaluate a number of webpages accessed by a target host within a time window (e.g., a rolling five minute window) and the uptime for each webpage request. If, for example, the metadata associated with the target host indicates that the number of webpages visited is high (e.g., indicating that the host is likely operated by a bot script due to the high number of webpages visited, such as 25 webpages in a five minute window), but if the uptime of each request is above a time threshold value (e.g., indicating that the host is likely operated by a human due to the high uptime of the host), then the host classification system can classify the host as being operated by a human. Further, if the number of webpages visited with a rolling time window are low (e.g., indicating that the host is likely operated by a human), but if the uptime of each request is below a time threshold value (e.g., indicating that the host is likely operated by a bot script because very low uptimes are impossible in certain circumstances unless a bot is operating the host), then the host classification system can classify the host as being operated by a bot script. It will be appreciated that the above rules and the corresponding conditions are exemplary, and thus, the present disclosure is not limited thereto. Any combination of time thresholds for webpages visited and uptime can be defined to detect hosts operated by bots and/or humans.

In some implementations, the host classification system can identify a set of hosts that represent examples of hosts that are detected as being operated by bot scripts. The host classification system can then evaluate the characteristics associated with the identified set of hosts using, for example, one or more machine-learning techniques. As a non-limiting example, the host classification system can identify that 100 hosts have each requested access to 10,000 or more webpages over the last five minute window. The host classification system can determine that the 100 hosts are operated by bot scripts due to the extremely high number of webpages accessed within a short period of time (e.g., the 10,000 webpages visited may exceed a threshold associated with detecting bots). Further, the host classification system can retrieve the metadata associated with the set of 100 hosts. The host classification system can then evaluate the metadata associated with the 100 hosts using one or more machine-learning techniques. In some implementations, machine-learning algorithms or techniques used for the contextual model can include an ensemble of multi-label classifiers (e.g., supervised learning), artificial neural networks (including backpropagation, Boltzmann machines, etc.), Bayesian statistics (e.g., Bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised, semi-supervised or unsupervised learning). For example, the host classification system can execute one or more machine-learning algorithms (e.g., such as a clustering technique) to evaluate the uptime included in the network packet headers for each of the 10,000 webpages accessed over the five minute window to identify patterns in the uptimes of the hosts operated by bots. For instance, the uptimes included in webpage requests from a certain group of bots may be separated in time by a constant increment, such as separated by 5 seconds. The host classification system can then define a rule that evaluates the uptimes for groups of hosts, and if the host classification system detects that a group of hosts correspond to uptimes that are each 5 seconds apart from each other, then the host classification system can determine that the group of hosts are likely operated by bots.

As a non-limiting example, if 10 or more webpages are detected as being accessed within one second from the same IP address, the source of those webpage requests may be determined to be a bot. However, advantageously, according to certain embodiments of the present disclosure, the host classification system can avoid a false positive of a detected bot by evaluating the uptimes associated with the 10 requests. For example, it may be possible that the 10 or more webpages were requested within one second by 10 or more different human users operating devices from a cloud-based network configured with one exit point (e.g., all traffic out of the single exit point would share the same IP address). In an organization of thousands of employees, it may be possible that 10 or more employees access the same webpage at the same time. In this example, the 10 or more webpages requests associated with the same IP address are actually not from bots. The host classification system can avoid this false positive by evaluating the uptime included in the network packet headers of each of the 10 or more webpage requests. For instance, if the host classification system detects a diversity of uptimes (e.g., all 10 uptimes are different from each other, and there is no detectable patterns between the 10 uptimes), the host classification system may determine that the 10 or more webpages are transmitted by hosts operated by human users, thereby avoid the false positive of detecting a bot. Conversely, if the host classification system detects that the uptimes for each of the 10 or more webpages are exactly the same, the host classification system may determine the source of the 10 or more webpage requests is a host operated by a bot script.

In some implementations, the data available in network packet headers representing each request to access a webpage can be recorded in a log. Logging the request to access the webpage can cause one or more characteristics of the requesting host and/or the webpage requested to be recorded. Non-limiting examples of characteristics that can be recorded in a log message include the IP address of the request, the user agent, how long the webpage was visited, device uptime, screen size, whether or not the host is using a physical monitor, and other suitable characteristics.

In some implementations, metadata can be associated with hosts. For example, metadata can be collected from hosts over time and stored in one or more databases accessible to the host classification system. Examples of metadata for a host can include the data collected from interactions between one or more web servers or applications servers and the host (e.g., the data available from the network packet headers, such as the uptime, from all of the webpage requests received from a particular host can be stored as metadata), a browsing history of a host, characteristics of browsing sessions (e.g., how long a host stayed on each webpage, which content objects, such as an ad, was viewed and/or selected by the host), and other suitable metadata.

In some implementations, the host classification system can detect the same bot over time, even if the host has been rebooted. For example, the host classification system can create a link between a newly detected bot (which has a low uptime due to a recent device reboot) and a previously detected bot so as to indicate that the two detected bots are the same bot. Each host may be associated with certain metadata that is collected from the host's interaction with a web server or application server over time (e.g., the host's webpage requests). The metadata may include certain characteristics of the host, such as the IP address of the host, the previously accessed webpages of the host, the uptime of the host's webpage request, the user agent, and other suitable metadata. The host classification system can evaluate the detected bots (e.g., detected over a time period) and identify two or more detected bots that have similar metadata (e.g., using a similar score or a confidence threshold), even if the two detected bots are associated with different uptimes. If the metadata of one bot corresponds to the metadata of another bot, but if the uptimes of the two bots are different, then it is possible that the bot has restarted. In some implementations, to perform the linking between detected bots, the host classification system can perform one or more clustering techniques on the uptimes of hosts using a particular IP address. The clustering may result in the identification of unique uptimes, which are then associated with unique devices.

It will be appreciated that detecting a newly reset host (e.g., detecting a host with a low uptime, such as two seconds) allows the host classification system to determine whether or not to link metadata previously associated with the host (e.g., metadata collected from previous interactions with the known host) with metadata newly collected about the host (e.g., metadata collected during a current browsing session with the host). Linking metadata previously associated with the host with metadata newly collected about host indicates host continuity. For example, whenever the host classification system detects a host with a low uptime (e.g., four seconds), the host classification can determine whether to evaluate existing metadata about hosts to link the detected host with one or more known hosts (e.g., hosts detected as being operated by a human) with the metadata recently collected about the host, or whether to classify the detected host as a bot. Advantageously, the detection of a host with a low uptime value may cause the host classification system to determine whether the low uptime is due to a plausible device reset by a human user, or whether to classify the host as a bot. If the host classification system determines to evaluate whether the low uptime is due a plausible reset by a human user, then the host classification system can link identify metadata previously associated with the host with the metadata currently or recently collected about the host during the current browsing session, so that the host is not classified as a bot, but rather, the host is linked to a host previously known as being operated by a human user.

It will be appreciated that the detection of a host may include generating a unique identifier (e.g., device fingerprint) to uniquely represent the host. Generating the unique identifier for a host may include extracting one or more timestamps that are embedded in the one or more network packets received from the host. The timestamps embedded in the one or more network packets can be evaluated by the host classification system to infer the "device uptime" (also referred to as "uptime" herein) of the host. For example, the "device uptime" may represent an amount of time that has lapsed since the last reboot of the host. In some examples, the unique identifier, which is potentially generated at least in part using the embedded timestamp(s), may be stored in first party cookies in individual website domains. Advantageously, the "device uptime" of a host can be used to individually identify multiple hosts that share the same IP address (e.g., due to the natural randomness of hosts being rebooted across a network). Further, the "device uptime" can be used in first-party cookie caching to generate unique identifiers, despite host power-off events that would reset the "device uptime" and would otherwise lead to a reset of the unique identifier. Certain metadata (e.g., IP address, browser version, uptime, etc.) may be generated or extracted based on interactions with a host. In some implementations, processing multiple metadata inputs to generate a unique identifier may involve a dual hashing technique that combines 1) a cryptographic hash that can uniquely identify hosts that are associated with different metadata, and 2) a locality sensitive hash that can intentionally result in matching/similar identifiers for inputs, in which a small amount of the metadata is different (such as a "device uptime" reset caused by rebooting the host). When two hosts have unique cryptographic hash values, but the same locality sensitive hash, a second step may be performed to determine whether the two unique cryptographic hash values represent the same host, such as a single host that experienced a change to the input metadata. As a non-limiting example, if only the "device uptime" has changed, the new uptime should be less than the time since the host was last detected by a web server or host classification system. If a host matching the original uptime is detected again by the web server or host classification system, the host classification system can infer that the smaller uptime represents a new host and that the host with the original uptime was not actually rebooted. Similar techniques can be used to match hosts that have an IP address change when the hosts access new networks because hosts often log in to the same networks (e.g., work, home, etc.) with regularity. Lastly, persisting these hashes to storage within first-party domains accessible to the host classification system enables the host classification system to store metadata and join identifiers across metadata changes, even if the metadata changes are too significant for the above matching techniques. For example, "alias" tables can be stored locally within a host, as well as within the host classification system. In some implementations, data stored in a host-side storage can be encrypted so that the host classification system has access to the stored metadata, and can enable the host classification to securely generate unique identifiers for individual hosts, despite changes to the metadata associated with the hosts, as described above.

FIG. 1 shows an example network environment 100 for detecting hosts operated by bot scripts to manage content delivery in real-time. In some implementations, network environment 100 can include user device 110, web server 120, host classification system 130, and data exchange platform 150. While user device 110 is illustrated as a mobile phone, it will be appreciated that user device 110 can be any host accessing web server 120. User device 110 can be operated by a human or a bot script configured to mimic a human user. Further, user device 110 can transmit (over one or more wired or wireless networks) a request to access a webpage stored at web server 120. For example, a user may be operating a mobile browser on user device 110, and the user may input a webpage address into the mobile browser, causing the request to be transmitted to web server 120. The webpage associated with the webpage address may include any content, including, but not limited to, one or more content objects (e.g., ads). In some implementations, the content objects may be stored at a data source independent from web server 120 (e.g., at a third-party data source or server). The content objects Web server 120 may be the server hosting the webpage requested by user device 110. It will be appreciated that the present disclosure is not limited to requesting access to webpages. For instance, an application server hosting a native or web application can be used instead of web server 120. In this example, the bot detection would occur for hosts requesting access to the application hosted by the application server.

Host classification system 130 may include one or more servers or processors configured to execute executable code. Host classification system 130 may also include a memory to store data, such as the executable code, results of performed functions included in the executable code, data retrieved from other data sources, and so on. The executable code may perform, when executed, any of the methods, algorithms, functions, processes, or techniques described herein (e.g., process 400 described in FIG. 4). In some implementations, host classification system 130 can determine in real-time whether or not data exchange platform 150 should transmit content objects to hosts that access a particular webpage.

When user device 110 requests access to web server 120, web server 120 can relay or forward the network packet headers received from user device 110 to host classification system 130 to determine whether user device 110 is likely operated by a human user or a bot script. In turn, host classification system 130 can make the assessment of whether user device 110 is operated by a human or a bot script based at least in part on the data available in the network packet headers (e.g., the uptime and the IP address of user device 110). For example, host classification system 130 can compare the uptime included in the network packet headers received from user device 110 against a threshold value to determine whether the uptime represents a realistic value. An uptime of one second, for example, is unlikely to exist in network packet headers from a host operated by a human because it is impossible to reboot a computer and load a browser with a webpage within one second. In some implementations, host classification system 130 can access internal or external data source 140 (which can be any number of data sources) to retrieve metadata associated with user device 110. The metadata (as described in greater detail herein) can represent previous interactions between user device 110 and web server 120. For example, the metadata can include the data available in the network packet headers from the previous webpage requests transmitted from user device 110 to web server 120. Further, the metadata can include one or more items of identifying information that can be used to identify user device 110 (e.g., IP address, uptime, device characteristics, cookie data, and so on). Host classification system 130 can evaluate the metadata associated with user device and/or the data available in the network packet headers received from user device 110 to determine whether or not user device is operated by a human or a bot. For example, host classification system can determine whether the uptime value included in the network packet headers from user device 110 are below a threshold (e.g., a short threshold of one second). If the uptime value is below the threshold, host classification system 130 may determine that user device 110 is likely operated by a bot script, whereas, if user device 110 is above a different threshold (e.g., a long threshold of 15 minutes), host classification system 130 may determine that the user device 110 is likely operated by a human. When host classification system 130 determines that user device 110 is operated by a bot script, then host classification system 130 can transmit a signal to data exchange platform 150 that causes data exchange platform 150 to inhibit transmitting one or more content objects to web server 120. However, when host classification system 130 determines that user device is operated by a human, then host classification system 130 can transmit a signal to data exchange platform 150 that causes data exchange platform 150 to transmit one or more content objects to web server 120, so that when the webpage loads on user device 110, the webpage will include the one or more content objects.

Data exchange platform 150 may include one or more servers or processors configured to execute executable code. Data exchange platform 150 may also include a memory to store data, such as the executable code, results of performed functions included in the executable code, data retrieved from other data sources, and so on. The executable code may perform, when executed, any or any part of the methods, algorithms, functions, processes, or techniques described herein. In some implementations, data exchange platform 150 may transmit one or more content objects to web server 120 every time a host requests access to the webpage hosted by web server 120. Data exchange platform 150 can retrieve the one or more content objects from content objects data source 160. However, as the content objects are intended for hosts operated by human users, host classification system 130 can instruct data exchange platform 150 to inhibit transmission of content objects to hosts that are detected as being operated by bot scripts.

Figure 2:
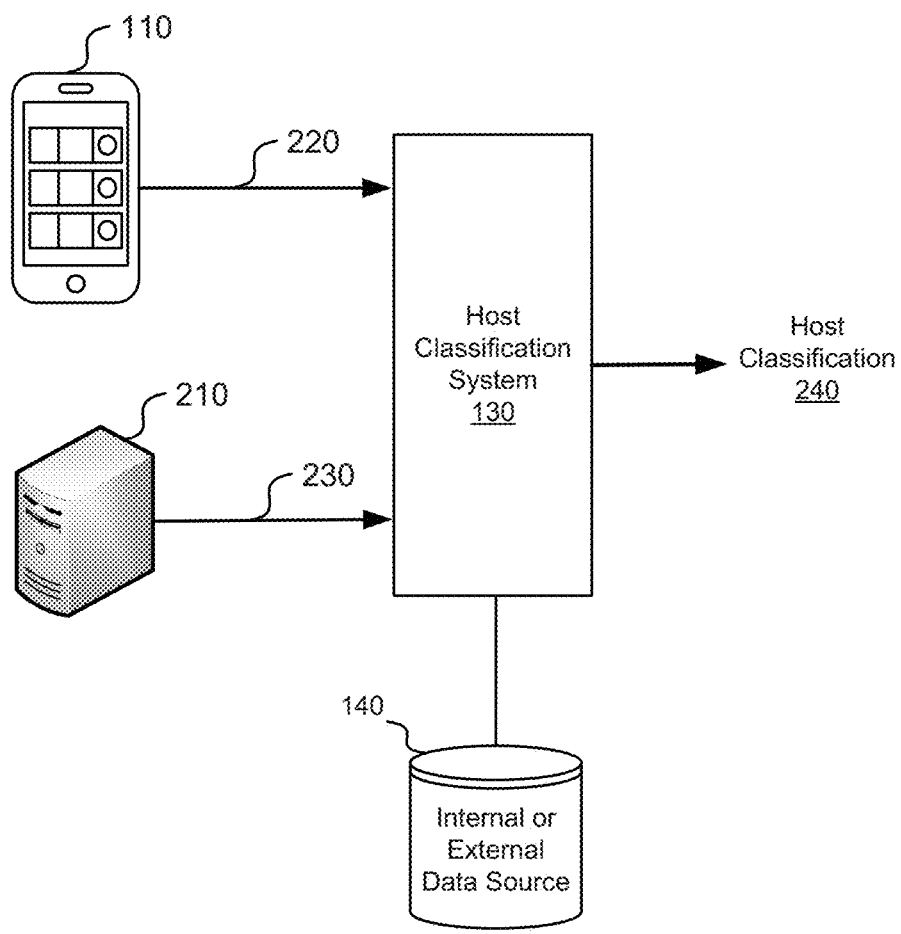
FIG. 2 is a block diagram illustrating another example network environment for device classification, according to embodiments of the present disclosure.

FIG. 2 shows an example network environment 200 for detecting hosts operated by bot scripts to manage content delivery in real-time. Host classification system 130 can detect that user device 110 is requesting access to a webpage (e.g., hosted by web server 120). For example, signal 220 may notify host classification system 130 that user device 110 is requesting access to a webpage. Further, in some implementations, signal 220 may include metadata associated with user device 110. In some implementations, signal 220 may include an identifier of user device 110 that can be used to query one or more databases that store metadata associated with user device 110. For example, signal 220 may include the data available in one or more network packet headers transmitted from user device 110 to the web server hosting the requested webpage. Similarly, host classification system 130 can detect that host 210 is requesting access to a webpage. For example, signal 230 may notify host classification system 130 that host 210 is requesting access to a webpage. Further, in some implementations, signal 230 may include metadata associated with host 210. In some implementations, signal 230 may include an identifier of host 210 that can be used to query one or more databases that store metadata associated with host 210. For example, signal 230 may include data available in one or more network packet headers transmitted from host 210 to the web server hosting the requested webpage.

Host classification system 130 can evaluate the metadata included in signal 220 to determine whether or not user device 110 is likely to be operated by a bot script. For example, host classification system 130 can evaluate the uptime (e.g., a timestamp indicating a time at which user device 110 was last rebooted) to determine whether or not user device 110 is operated by a bot script. As a non-limiting example, if the uptime included in the one or more network packet headers from user device 110 indicated that user device 110 was last rebooted one second ago, host classification system 130 can determine that user device 110 is likely to be operated by a bot script. In this example, host classification system 130 can retrieve one or more rules for detecting bots (e.g., from internal or external data source 140) and compare the uptime against the one or more rules. For example, a rule may include a condition of a threshold time that represents a time that is too fast for human users to accomplish, such as a threshold uptime of one second. In other words, it would be too fast for a human user to reboot a host (e.g., user device 110) and begin loading a webpage on a browser within one second of the timestamp of the reboot. According, host classification system 130 may detect that hosts with devices below one second may be operated by bot scripts.

In some implementations, host classification 240 may be the data outputted by host classification system 130 after evaluating the one or more network packet headers and/or metadata associated with user device 110 and host 210. Host classification 240 may be transmitted to data exchange platform 150 as a notification of a bot detection result. For example, host classification 240 may include data representing that host 210 is detected as being a bot, or that user device 110 is detected as being operated by a human. In some implementations, host classification 240 may be a signal with instructions to enable or inhibit transmission of content objects to the host that is requesting access to a webpage. For example, if host classification system 130 detects that host 210 is being operated by a bot script, host classification 240 may be a signal transmitted to data exchange platform 150, such that the signal includes an instruction to inhibit transmission of content objects to host 210 (in association with host 210's request to access a webpage). As a result, when host 210 loads a webpage, the webpage will not include the data representing one or more content objects.

Figure 3:
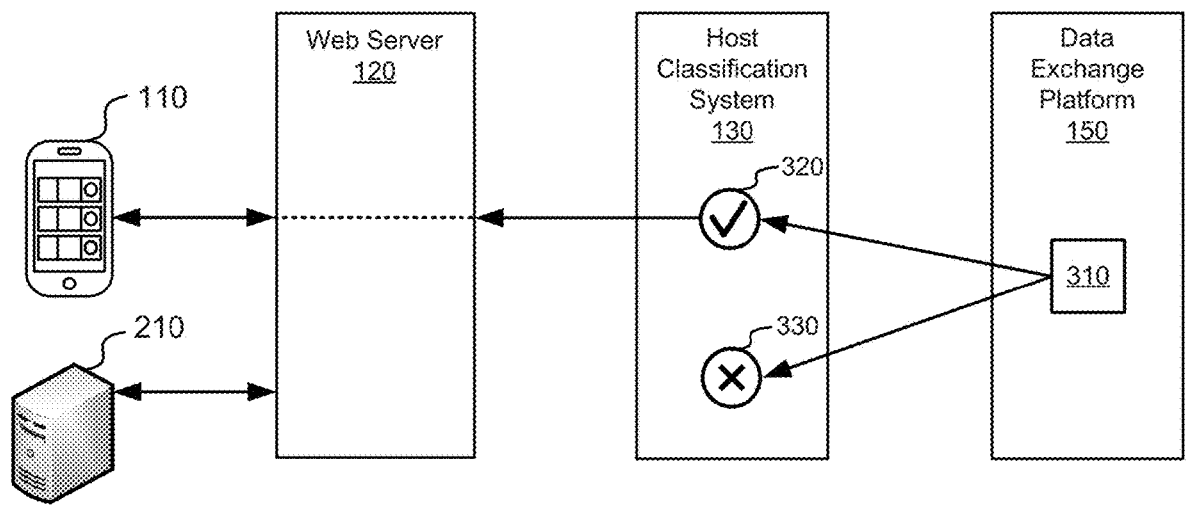
FIG. 3 is a block diagram illustrating yet another example network environment for device classification, according to embodiments of the present disclosure.

FIG. 3 is a block diagram illustrating network environment 300 for classifying hosts, according to embodiments of the present disclosure. Network environment 300 may include web server 120, host classification system 130, and data exchange platform 150. Data exchange platform can communicate with web server 120 and/or host classification system 130 over one or more networks. When hosts communicate with web server 120 to request access to a webpage, web server 120 communicates with data exchange platform 150 to request one or more content objects to display on the webpage. As a non-limiting example, web server 120 may request one or more ads from data exchange platform 150, so that web server 120 can cause the one or more ads to be displayed on the webpage that is loaded onto the host's browser. Advertisers may be charged a fee for each instance that an ad is displayed on a webpage, and thus, it is advantageous to prevent ads from being displayed on webpages accessed by bots. Content object 310 can be data (e.g., image data, video data, and/or audio data) that is presentable on a webpage, such as an advertisement.

In some implementations, host classification system 130 is located in the communication flow between web server 120 and data exchange platform 150. Host classification system 130 can detect whether a host is operated by a bot based at least in part on one or more request parameters (e.g., characteristics or data items) included in the network packet headers received from the host. Host classification system 130 can instruct data exchange platform 150 to either enable or inhibit transmission of content objects to the hosts for displaying on webpages.

As illustrated in the example of FIG. 3, user device 110 may request access to a webpage hosted by web server 120. User device 110 may transmit one or more network packet headers to web server 120 requesting access to a webpage. Upon receiving the one or more network packet headers from user device 110, web server 120 may transmit or relay the one or more network packet headers to host classification system 130 for bot detection. The one or more network packet headers from user device 110 may include data associated with user device 110 and/or the request from user device 110. For example, the one or more network packet headers may include, but is not limited to, the uptime of user device 110 (e.g., a timestamp representing the most recent time at which user device 110 was rebooted), the operating system running on user device 110, the size of the screen connected to user device 110, the browser version, the IP address, and other suitable examples. Similarly, host 210 may request access to the webpage hosted by web server 120. Web server 120 may also transmit or relay the one or more network packet headers from host 210 to host classification system 130 for bot detection.

Host classification system 130 can evaluate the network packet headers from user device 110 to determine whether or not data exchange platform 150 should transmit content object 310 to web server 120 for displaying on the webpage requested by user device 110. For example, host classification system 130 can determine that the data available in the network packet headers from user device 110 indicate that user device 110 is likely operated by a human user. In this example, the one or more network packet headers may include an uptime of user device 110. Host classification system 130 can apply one or more rules to the data available in the network packet headers from user device 110 to determine that user device 110 is likely operated by a human. For instance, a rule may include a threshold time for comparing with the uptime of user device 110. The uptime of a host exceeding the threshold time may indicate a likelihood that the host is operated by a human (e.g., because the uptime is sufficiently long). Accordingly, at result 320, host classification can determine (in real-time based on the network packet headers) that user device 110 is likely operated by a human. Thus, data exchange platform 150 may transmit content object 310 to web server 120 so as to be displayed on the webpage when the webpage is loaded onto the browser of user device 110.

Similarly, host classification system 130 can evaluate the network packet headers from host 210 to determine whether or not data exchange platform 150 should transmit content object 310 to web server 120 for displaying on the webpage requested by host 210. For example, host classification system 130 can determine that the data available in the network packet headers from host 210 indicate that host 210 is likely operated by a bot script. In this example, the one or more network packet headers may include an uptime of host 210. Host classification system 130 can apply one or more rules to the data available in the network packet headers from host 210 to determine that host 210 is likely operated by a bot script. For instance, similar to the example above, a rule may include a threshold time for comparing with the uptime of host 210. The uptime of a host being below the threshold time may indicate a likelihood that the host is operated by a bot script (e.g., because the uptime is too short to be realistic, such as a one second threshold). Thus, at result 330, data exchange platform 150 may inhibit content object 310 from being transmitted to web server 120. As a result, when the webpage is loaded onto the browser of host 210, the webpage will not display content object 310. The present disclosure is not limited to the evaluation of uptime values for hosts, and thus, it will be appreciated that any data may be used in the bot detection performed by host classification system 130.

Figure 4:
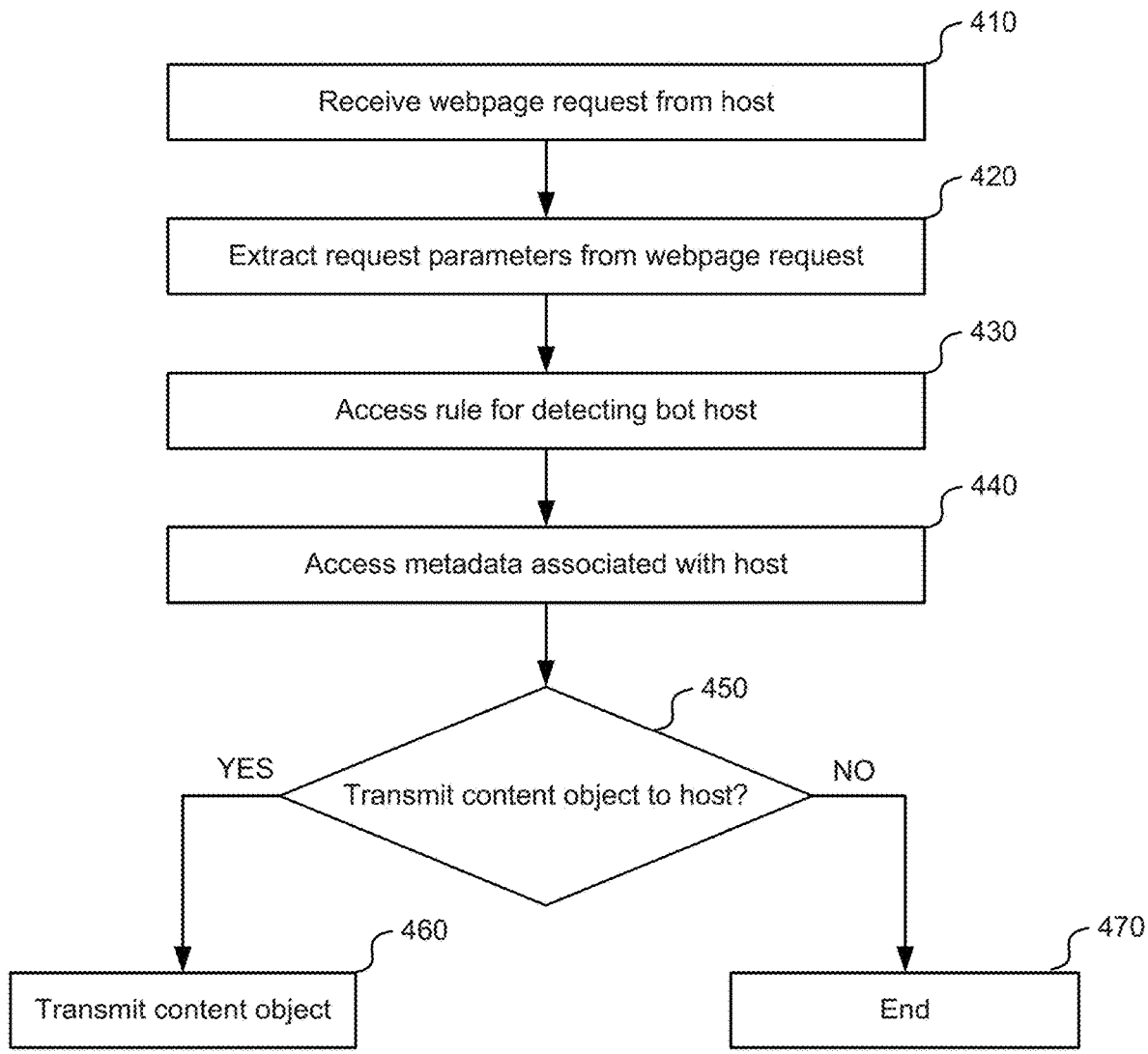
FIG. 4 is a flowchart illustrating an example process for device classification, according to embodiments of the present disclosure.

FIG. 4 is a flowchart illustrating a process for detecting bots in real-time. Process 400 may be entirely performed, or at least performed in part, by any of a host (e.g., user device 110), a web server (e.g., web server 120), a host classification system (e.g., host classification system 130), and a data exchange platform (e.g., data exchange platform 150). Further, process 400 may be performed to detect hosts operated by bots in real-time based on data available in network packet headers (e.g., without needing to download any code, such as JavaScript, on the browsers of hosts to generate signals used for bot detection). Process 400 can be used to generate a bot detection result that is used by a data exchange platform to determine whether or not to transmit one or more content objects to hosts for displaying on webpages.

Process 400 begins at block 410 where a webpage request is received from a host. The webpage request may be a request generated by a browser running on a host. For example, in response receiving input corresponding to a webpage address at the browser, the browser may generate a webpage request that is transmitted to the corresponding web server. At block 420, one or more request parameters may be extracted from the data available in the webpage request. Non-limiting examples of a request parameter may include a data element in a data string (e.g., an HTTP query string), a characteristic of a host included in one or more network packet headers, such as the IP address, the device uptime, the device type (e.g., mobile or desktop), the user agent, and any other suitable data. At block 430, one or more rules may be accessed for detecting bots. For example, a rule may include a condition that, once satisfied, indicates that the host is operated by a bot. Depending on embodiments, satisfying the condition may also indicate that the host is operated by a human. At block 440, metadata associated with the host may be accessed. For example, metadata representing previously-logged interactions between the host and one or more web servers may be stored at a database and subsequently retrieved during the host classification or bot detection.

At block 450, the host classification system can evaluate the data available in the one or more network packet headers, the accessed rules, and/or the retrieved metadata to determine whether the host is likely operated by a bot script. If the host classification system determines that the host is likely a bot, then process 400 proceeds to block 470, where the data exchange platform inhibits transmission of a content object to the host or web server. Conversely, if the host classification system determines that the host is likely operated by a human, then process 400 proceeds to block 460, where the data exchange platform transmits the content object to the host or web server, so that when the webpage is loaded on the host, the webpage will include the content object. It will be appreciated that one or more steps of process 400 may be selectively performed and/or the order of steps in FIG. 4 may be rearranged while still performing bot detection according to certain embodiments described herein.

Figure 5:
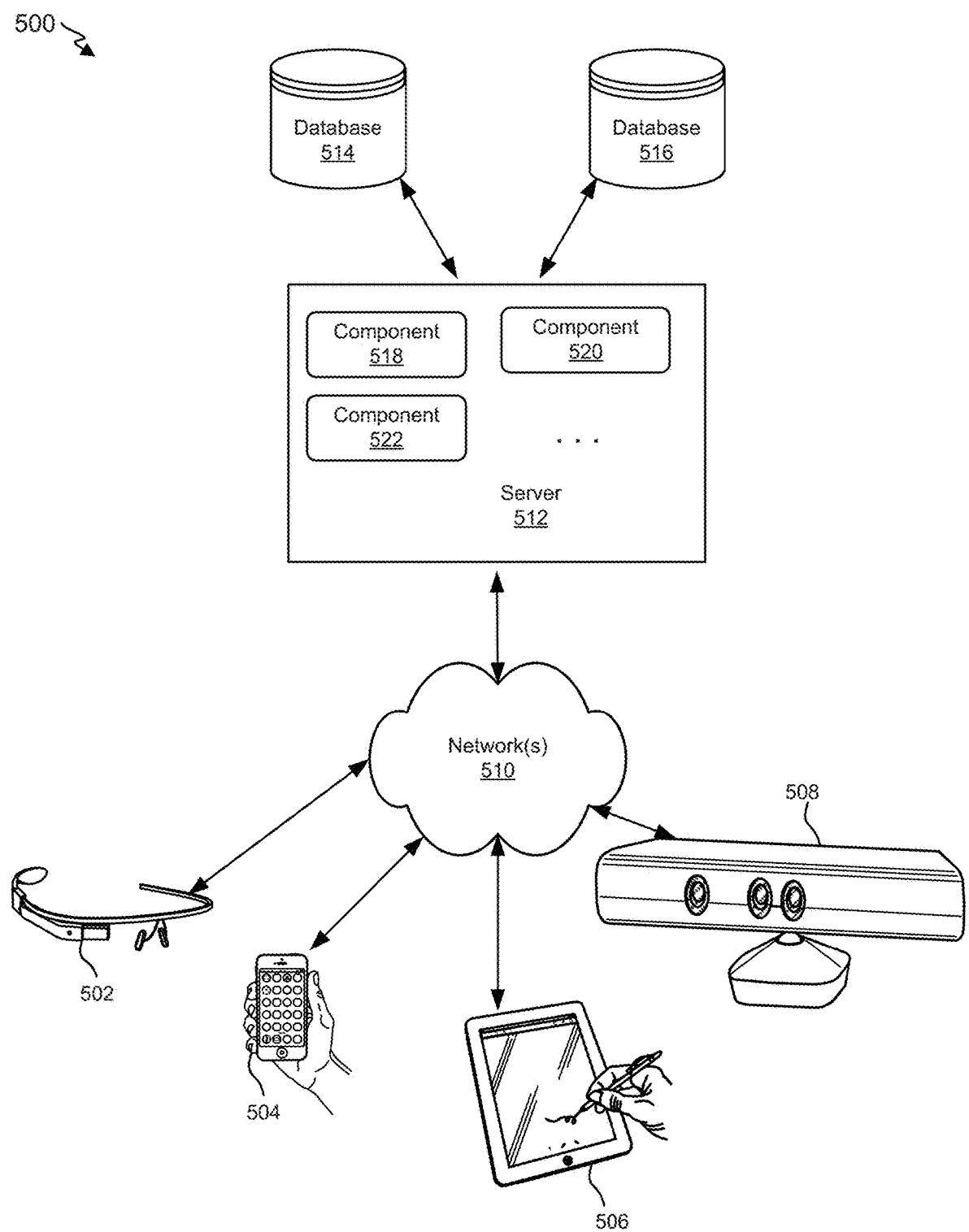
FIG. 5 is a simplified diagram illustrating a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
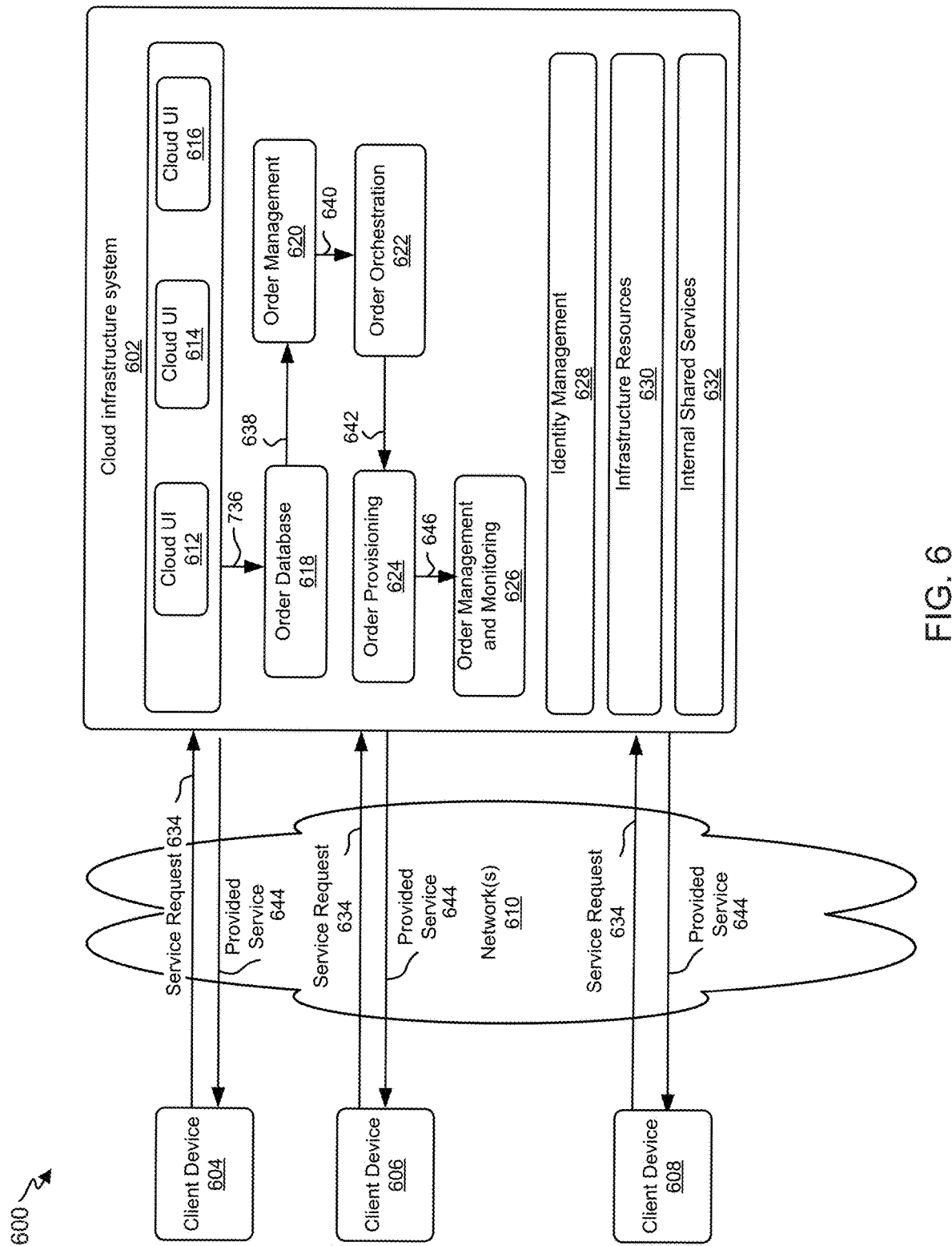
FIG. 6 is a simplified block diagram illustrating one or more components of a system environment.

FIG. 6 is a simplified block diagram of one or more components of a system environment 600 by which services provided by one or more components of an embodiment system may be offered as cloud services, in accordance with an embodiment of the present disclosure. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 510.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of processes associated with each order and applies logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
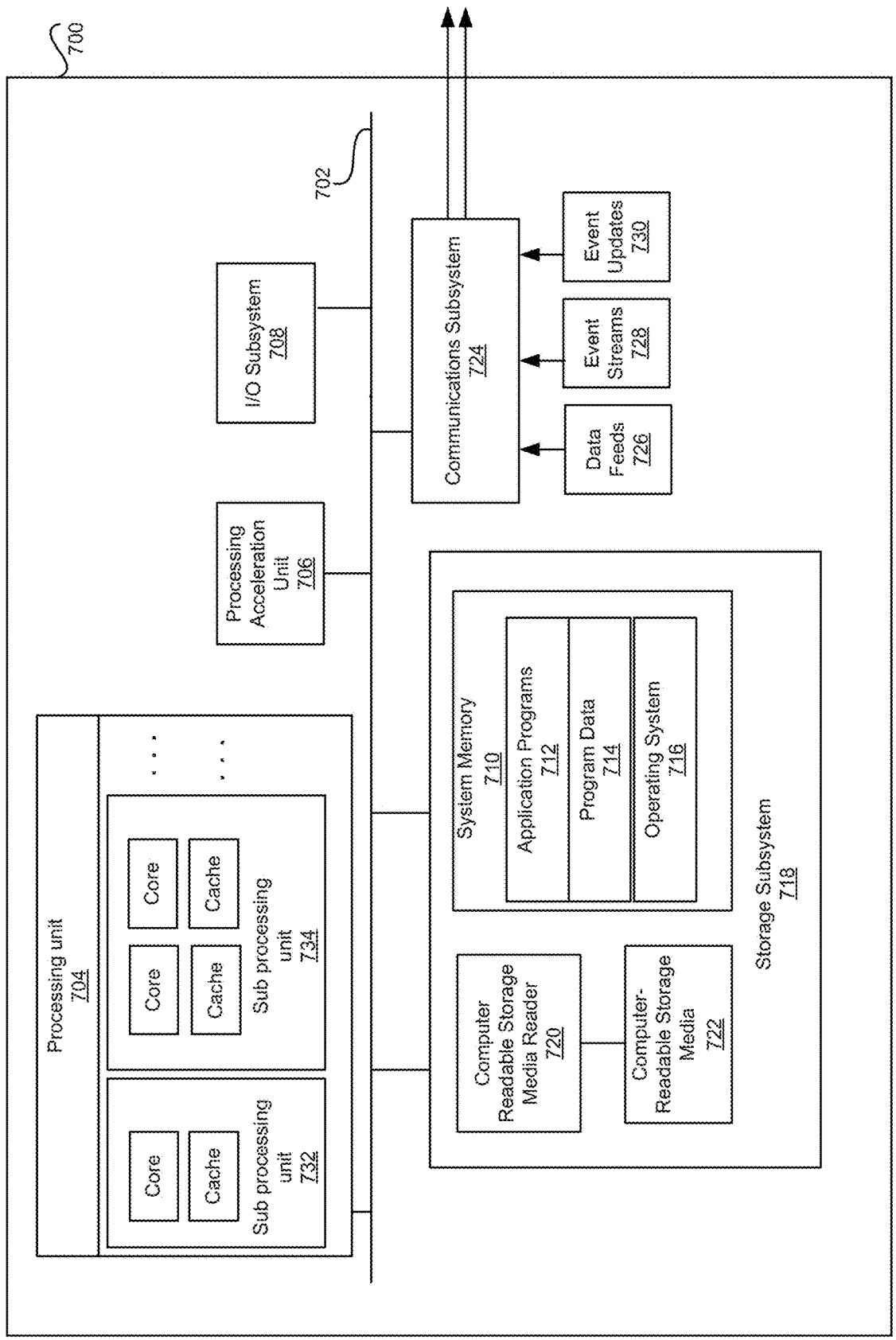
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 924 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   receiving a request to retrieve webpage data stored at a server, the webpage data corresponding to a webpage that is configured to display one or more content objects, the request corresponding to a data string that includes one or more request parameters, each request parameter of the one or more request parameters characterizing a client device, and the one or more request parameters including at least an uptime of the client device;
   extracting the one or more request parameters included in the data string of the request;
   accessing one or more rules for detecting whether the client device is operated by a bot script or a human, each rule of the one or more rules including a condition that, upon satisfaction, indicates that the client device is operated by a bot script;
   accessing metadata associated with the client device, the metadata representing one or more previous interactions between the client device and the server;
   automatically determining whether or not to transmit a particular content object to the client device, the automatic determination being based on a result of evaluating the one or more rules using the uptime of the client device, the one or more request parameters, and/or the metadata associated with the client device; and
   in response to determining to transmit the particular content object to the client device, transmitting the particular content object, the transmission of the particular content object indicating that the client device is detected as being operated by a human.

2. The computer-implemented method of claim 1, wherein a rule of the one or more rules evaluates the uptime of the client device against a defined time threshold, wherein when the uptime of the client device is below the defined time threshold, the client device is detected as being operated by a bot script, and wherein when the uptime of the client device is equal to or greater than the defined time threshold, the client device is detected as being operated by a human.

3. The computer-implemented method of claim 2, further comprising:
   determining to inhibit transmission of the particular content object to the client device when the client device is detected as being operated by a bot script; and
   determining to transmit the particular content object to the client device when the client device is detected as being operated by a human.

4. The computer-implemented method of claim 1, further comprising:
   determining that the uptime of the client device is below a time threshold, wherein uptimes below the time threshold are associated with client devices operated by bot scripts, and wherein uptimes above the time threshold are associated with client devices operated by human users;
   evaluating the metadata associated with the client device, wherein the evaluation includes:
      identifying a previous request to retrieve the webpage data, wherein the previous request was previously received from the client device;
      identifying a previous uptime associated with the client device, wherein the previous uptime is included in a previous data string corresponding to the previous request; and
      determining that the previous uptime associated with the client device is equal to or greater than the time threshold; and
   determining to transmit the particular content object to the client device despite the uptime of the client device being below the time threshold, the determination to transmit the particular content object being based at least in part on a result of evaluating the metadata associated with the client device.

5. The computer-implemented method of claim 1, further comprising:
   identifying a plurality of additional requests to retrieve the webpage data, each additional request of the plurality of additional requests being associated with an uptime of an additional client device;
   performing one or more clustering techniques on the plurality of additional requests, the performance of the one or more clustering techniques identifying a number of unique uptimes associated with the plurality of additional requests; and
   determining that the number of unique uptimes corresponds to a number of unique client devices transmitting the plurality of additional requests.

6. The computer-implemented method of claim 1, further comprising:
   identifying a set of additional requests to retrieve the webpage data, each additional request of the set of additional requests being associated with an additional uptime of an additional client device;
   identifying a subset of the set of additional requests, each additional request of the subset of additional requests corresponding to an additional uptime that is below a time threshold, the additional uptime being below the time threshold indicating that the corresponding additional client device is detected as being operated by a bot script;

evaluating the subset of additional requests using one or more machine-learning techniques, the evaluation of the subset of additional requests resulting in detecting one or more patterns associated with uptimes of additional client devices associated with bot scripts; and automatically generating an additional rule to include in the one or more rules for detecting client devices operated by bot scripts.

7. The computer-implemented method of claim 1, further comprising:

generating a human user score for the client device, the human user score being generated based at least in part on the result of evaluating the one or more rules using the uptime of the client device, the one or more request parameters, and/or the metadata associated with the client device, the human user score representing a degree to which the client device is detected as being operated by a human; and determining whether or not to transmit the particular content object to the client device based at least in part on the generated human user score.

8. A system, comprising:

one or more data processors; and a non-transitory computer-readable storage medium containing instructions which, when executed on the one or more data processors, cause the one or more data processors to perform operations including:

receiving a request to retrieve webpage data stored at a server, the webpage data corresponding to a webpage that is configured to display one or more content objects, the request corresponding to a data string that includes one or more request parameters, each request parameter of the one or more request parameters characterizing a client device, and the one or more request parameters including at least an uptime of the client device;

extracting the one or more request parameters included in the data string of the request;

accessing one or more rules for detecting whether the client device is operated by a bot script or a human, each rule of the one or more rules including a condition that, upon satisfaction, indicates that the client device is operated by a bot script;

accessing metadata associated with the client device, the metadata representing one or more previous interactions between the client device and the server;

automatically determining whether or not to transmit a particular content object to the client device, the automatic determination being based on a result of evaluating the one or more rules using the uptime of the client device, the one or more request parameters, and/or the metadata associated with the client device; and in response to determining to transmit the particular content object to the client device, transmitting the particular content object, the transmission of the particular content object indicating that the client device is detected as being operated by a human.

9. The system of claim 8, wherein a rule of the one or more rules evaluates the uptime of the client device against a defined time threshold, wherein when the uptime of the client device is below the defined time threshold, the client device is detected as being operated by a bot script, and wherein when the uptime of the client device is equal to or greater than the defined time threshold, the client device is detected as being operated by a human.

10. The system of claim 9, further comprising:

determining to inhibit transmission of the particular content object to the client device when the client device is detected as being operated by a bot script; and determining to transmit the particular content object to the client device when the client device is detected as being operated by a human.

11. The system of claim 8, wherein the operations further comprise:

determining that the uptime of the client device is below a time threshold, wherein uptimes below the time threshold are associated with client devices operated by bot scripts, and wherein uptimes above the time threshold are associated with client devices operated by human users;

evaluating the metadata associated with the client device, wherein the evaluation includes:

identifying a previous request to retrieve the webpage data, wherein the previous request was previously received from the client device;

identifying a previous uptime associated with the client device, wherein the previous uptime is included in a previous data string corresponding to the previous request; and determining that the previous uptime associated with the client device is equal to or greater than the time threshold; and determining to transmit the particular content object to the client device despite the uptime of the client device being below the time threshold, the determination to transmit the particular content object being based at least in part on a result of evaluating the metadata associated with the client device.

12. The system of claim 8, wherein the operations further comprise:

identifying a plurality of additional requests to retrieve the webpage data, each additional request of the plurality of additional requests being associated with an uptime of an additional client device;

performing one or more clustering techniques on the plurality of additional requests, the performance of the one or more clustering techniques identifying a number of unique uptimes associated with the plurality of additional requests; and determining that the number of unique uptimes corresponds to a number of unique client devices transmitting the plurality of additional requests.

13. The system of claim 8, wherein the operations further comprise:

identifying a set of additional requests to retrieve the webpage data, each additional request of the set of additional requests being associated with an additional uptime of an additional client device;

identifying a subset of the set of additional requests, each additional request of the subset of additional requests corresponding to an additional uptime that is below a time threshold, the additional uptime being below the time threshold indicating that the corresponding additional client device is detected as being operated by a bot script;

evaluating the subset of additional requests using one or more machine-learning techniques, the evaluation of the subset of additional requests resulting in detecting one or more patterns associated with uptimes of additional client devices associated with bot scripts; and automatically generating an additional rule to include in the one or more rules for detecting client devices operated by bot scripts.

14. The system of claim 8, wherein the operations further comprise:
generating a human user score for the client device, the human user score being generated based at least in part on the result of evaluating the one or more rules using the uptime of the client device, the one or more request parameters, and/or the metadata associated with the client device, the human user score representing a degree to which the client device is detected as being operated by a human; and
determining whether or not to transmit the particular content object to the client device based at least in part on the generated human user score.

15. A computer-program product tangibly embodied in a non-transitory machine-readable storage medium, including instructions configured to cause a data processing apparatus to perform operations including:
receiving a request to retrieve webpage data stored at a server, the webpage data corresponding to a webpage that is configured to display one or more content objects, the request corresponding to a data string that includes one or more request parameters, each request parameter of the one or more request parameters characterizing a client device, and the one or more request parameters including at least an uptime of the client device;
extracting the one or more request parameters included in the data string of the request;
accessing one or more rules for detecting whether the client device is operated by a bot script or a human, each rule of the one or more rules including a condition that, upon satisfaction, indicates that the client device is operated by a bot script;
accessing metadata associated with the client device, the metadata representing one or more previous interactions between the client device and the server;
automatically determining whether or not to transmit a particular content object to the client device, the automatic determination being based on a result of evaluating the one or more rules using the uptime of the client device, the one or more request parameters, and/or the metadata associated with the client device; and
in response to determining to transmit the particular content object to the client device, transmitting the particular content object, the transmission of the particular content object indicating that the client device is detected as being operated by a human.

16. The computer-program product of claim 15, wherein a rule of the one or more rules evaluates the uptime of the client device against a defined time threshold, wherein when the uptime of the client device is below the defined time threshold, the client device is detected as being operated by a bot script, and wherein when the uptime of the client device is equal to or greater than the defined time threshold, the client device is detected as being operated by a human.

17. The computer-program product of claim 16, wherein the operations further comprise:
determining to inhibit transmission of the particular content object to the client device when the client device is detected as being operated by a bot script; and
determining to transmit the particular content object to the client device when the client device is detected as being operated by a human.

18. The computer-program product of claim 15, wherein the operations further comprise:
determining that the uptime of the client device is below a time threshold, wherein uptimes below the time threshold are associated with client devices operated by bot scripts, and wherein uptimes above the time threshold are associated with client devices operated by human users;
evaluating the metadata associated with the client device, wherein the evaluation includes:
identifying a previous request to retrieve the webpage data, wherein the previous request was previously received from the client device;
identifying a previous uptime associated with the client device, wherein the previous uptime is included in a previous data string corresponding to the previous request; and
determining that the previous uptime associated with the client device is equal to or greater than the time threshold; and
determining to transmit the particular content object to the client device despite the uptime of the client device being below the time threshold, the determination to transmit the particular content object being based at least in part on a result of evaluating the metadata associated with the client device.

19. The computer-program product of claim 15, wherein the operations further comprise:
identifying a plurality of additional requests to retrieve the webpage data, each additional request of the plurality of additional requests being associated with an uptime of an additional client device;
performing one or more clustering techniques on the plurality of additional requests, the performance of the one or more clustering techniques identifying a number of unique uptimes associated with the plurality of additional requests; and
determining that the number of unique uptimes corresponds to a number of unique client devices transmitting the plurality of additional requests.

20. The computer-program product of claim 15, wherein the operations further comprise:
identifying a set of additional requests to retrieve the webpage data, each additional request of the set of additional requests being associated with an additional uptime of an additional client device;
identifying a subset of the set of additional requests, each additional request of the subset of additional requests corresponding to an additional uptime that is below a time threshold, the additional uptime being below the time threshold indicating that the corresponding additional client device is detected as being operated by a bot script;
evaluating the subset of additional requests using one or more machine-learning techniques, the evaluation of the subset of additional requests resulting in detecting one or more patterns associated with uptimes of additional client devices associated with bot scripts; and
automatically generating an additional rule to include in the one or more rules for detecting client devices operated by bot scripts.

* * * * *